G. M. AND O. GUNNETT.
NUT LOCK.
APPLICATION FILED JULY 20, 1920.

1,387,258.

Patented Aug. 9, 1921.

Inventor:
George M. Gunnett and
Olen Gunnett
by Jas. L. Skidmore
their Atty.

UNITED STATES PATENT OFFICE.

GEORGE M. GUNNETT AND OLEN GUNNETT, OF FROSTBURG, MARYLAND.

NUT-LOCK.

1,387,258. Specification of Letters Patent. Patented Aug. 9, 1921.

Application filed July 20, 1920. Serial No. 397,717.

*To all whom it may concern:*

Be it known that we, GEORGE M. GUNNETT and OLEN GUNNETT, citizens of the United States, residing at Frostburg, in the county of Allegany and State of Maryland, have invented certain new and useful Improvements in Nut-Locks, of which the following is a specification.

This invention relates to a nut-lock of that class wherein the locking means forms a portion of the bolt which is utilized in connection with the nut, and any nut of proper dimensions may be used.

The prime object of this invention is to provide simple, durable, economical and efficient means for securely and firmly locking a nut against the material held together by a bolt.

Another object of the invention is to so construct our improved locking means that a portion of the bolt is adapted to overlap a portion of the outer surface of the nut, thereby preventing the nut which has been threaded upon the bolt from loosening.

A further object of this invention resides in the provision of a channeled bolt formed with diametrically opposite slots slightly off the central axis of the bolt extending for a suitable portion of the length of the threaded portion of said bolt, and forming a multiplicity of sections of different and varying areas, and permitting that section of the bolt forming the least area to be bent over and into a recess formed in the outer face of the nut, thereby constituting an efficient locking means and securing it at all times a tight connection.

The foregoing and such other objects as may appear from the ensuing description are attained by the construction, arrangement, combination and location of the parts hereinafter more fully described, illustrated by the accompanying drawings forming a part of this specification, and more particularly pointed out in the claim appended hereto, it being understood that slight changes in the precise form, proportions and minor details of the construction may be resorted to without departing from the spirit of the invention or sacrificing any of the advantages thereof.

In the accompanying drawings it will be seen that:—

Similar numerals of reference are employed to designate like parts throughout the several views.

Figure 1:
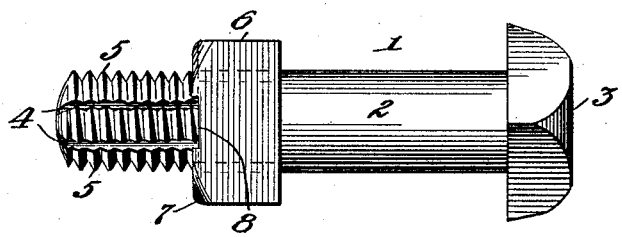
Figure 1 is an elevation of the nut and bolt embodying our invention before being locked.

In carrying out our invention as illustrated in the drawings, the numeral 1, designates the bolt made of any suitable metal, preferably steel, which consists of a shank 2, formed at one end with a head 3, and having the diametrically opposite slots 4, preferably four in number, said slots being formed slightly off the precise central axis of the bolt and extending for a suitable portion of the length of the threaded portion of said bolt, thereby forming a multiplicity of sections 5, of varying and different areas in the threaded portion of the bolt. The numeral 6 represents the nut which may be of any suitable material and dimensions, the outer corners of which are preferably beveled at 7, and in the outer face of said nut is formed a multiplicity of recesses or depressions 8 of equal area, for the purpose hereinafter described.

Figure 2:
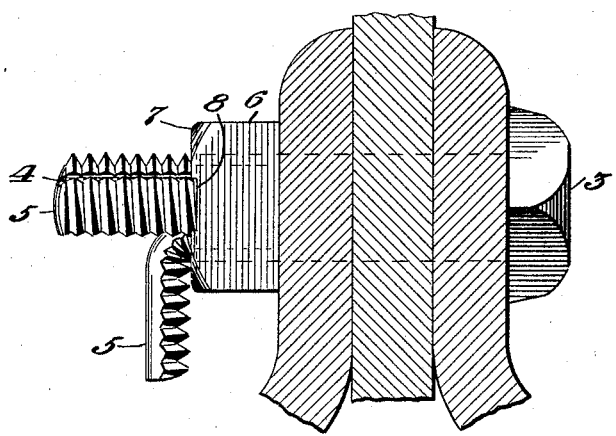
Fig. 2 is partly in section, and partly in elevation, illustrating our improvement adapted to the fish-plate joint of a railway rail, the nut being shown locked upon the bolt.
Figure 3:
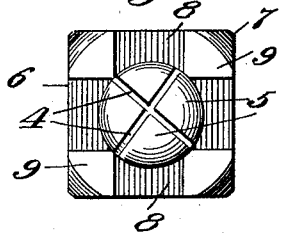
Fig. 3 is an end view of the bolt and nut without the locking means in place.

In Fig. 2, we have shown the device in its locked position, and the method of operation is as follows:— The nut 6, is placed upon the threaded portion of the bolt 1, and when it is adjusted firmly and tightly against the material held together by the bolt, that section 5 constituting the least area of the slotted portion of the bolt is forced or bent over into one of the recesses 8 formed in the outer face of the nut and caused to overlap a portion of the nut, thereby securely locking the nut in its adjusted position, while the remaining sections 5 of the nut being of greater area than the recesses 8, remain in contact with the extended portions 9 of the nut, thereby preventing any loose play, and materially assist in locking the nut in fixed position.

It will be seen that the multiplicity of recesses or depressions 8 formed in the outer face of the nut are of the same area and are adapted to receive that section of the threaded portion of the bolt which has the least area, hence when the nut is properly adjusted, said bolt section will register with one of the several recesses, and when forced or bent outwardly, a portion of the said section will be caused to rest within one of the recesses and overlap a portion of the outer face of the nut.

The advantages of a nut lock of this kind are readily apparent from the foregoing description, since the nut is absolutely locked to the bolt and can never be accidentally removed by any ordinary jar or vibrations nor by any malicious parties or others without the use of special tools or machinery, and in the event that the bolt should become loose, from any cause whatever, it cannot be accidentally withdrawn from the nut, on account of the construction of the bolt with its overlapping section resting within the recess in outer face of the nut.

Having thus described our invention what we claim and desire to secure by Letters Patent is:—

A nut lock of the character described, comprising a bolt having its entire screw-threaded end portion split longitudinally with a plurality of diagonally arranged slots extending transversely therethrough forming four longitudinal sections, and a nut provided with a plurality of recesses formed in its outer face, said recesses being adapted to receive one of the bolt sections to lock the nut to said bolt.

GEORGE M. GUNNETT
OLEN GUNNETT.